United States Patent [19]

Sundberg

[11] Patent Number: 4,505,377

[45] Date of Patent: Mar. 19, 1985

[54] ARRANGEMENT IN LOG-FEEDING APPARATUS

[75] Inventor: Erik Sundberg, Hofors, Sweden

[73] Assignee: Waller Innovation AB of Falufagen 22, Sweden

[21] Appl. No.: 490,035

[22] Filed: Apr. 29, 1983

[30] Foreign Application Priority Data

May 18, 1982 [SE] Sweden ................................ 8203150

[51] Int. Cl.[3] ................................................ B65G 29/00

[52] U.S. Cl. ................................ 198/624; 144/246 R; 144/245 R; 144/246 D

[58] Field of Search ................................ 198/624, 627; 144/246 R, 246 F, 246 D, 245 R, 245 A; 188/297, 299, 272

[56] References Cited

U.S. PATENT DOCUMENTS 3,844,399 9/1974 Sellers, Jr. et al. ................. 198/624
4,408,738 9/1983 Mazelsky ................................ 188/299
4,425,952 1/1984 Pousette et al. ..................... 198/624

FOREIGN PATENT DOCUMENTS 1553515 1/1969 France ................................ 198/624

*Primary Examiner*—Joseph E. Valenza
*Assistant Examiner*—Douglas C. Voorhees
*Attorney, Agent, or Firm*—Kinzer, Plyer, Dorn & McEachran

[57] ABSTRACT

A log-feeding apparatus comprises at least three feed rollers (9, 10, 11) mounted on feed arms (6, 7, 8), the movements of which for moving the feed rollers is determined by means of a linkage system (16, 17, 18, 21, 22, 23) coupled to the feed arms. The linkage system is actuated by means of a piston-cylinder device (24, 25). The cylinder is pivotally mounted at its one end on a shaft (29). In accordance with the invention, the shaft (29) is journalled in a displaceable slide, to actuate the linkage system without simultaneously activating the piston-cylinder device.

4 Claims, 3 Drawing Figures

ARRANGEMENT IN LOG-FEEDING APPARATUS

The present invention relates to an arrangement in log-feeding apparatus of the kind which include at least three driven feed rollers, which rollers are mounted on feed arms of mutually equal length and which form therebetween a log-accommodating space, and in which apparatus an end-portion of each feed arm is rotatably journalled at a point on a circular line on a carrier arranged to be guided by means of a system of links, said linkage system being connected to the piston rod of a main hydraulic piston-cylinder device, such that the rollers are swung towards and away from each other as the piston rod is extended and withdrawn respectively.

Normally, only three feed rollers are used, these rollers being cylindrical and having on the outer cylindrical surface thereof spike-like dogging means, which bite into the logs and feed the same through the free opening formed by the three rollers, the cylindrical surfaces of which form an equilateral triangle, the so-called primary opening. The primary opening formed when the piston rod is fully extended must be dimensioned for the log of smallest diameter to be gripped by the feed rollers. Within certain limits, logs of larger diameter can be fed through the opening, by permitting the feed rollers to be pushed away from each other, in a manner to widen the triangular opening, whereupon the piston rod is forced back into the cylinder, and pressure-oil is pushed out of said cylinder, into a gas-filled reservoir. The dimensional range of the opening will seldomly suit all the logs to be fed through the log-feeding apparatus, to a barking apparatus for example, and the logs must therefore be sorted into batches, each containing logs of given dimensions. When a batch of logs whose dimensions are greater than those of a preceding batch is to be fed through the apparatus, the primary opening must be widened. This can be done by moving the pivot point of the cylinder in the log-feed apparatus, or by changing the whole of the piston-cylinder device. Movement of the cylinder pivot location and replacement of the piston-cylinder device are both difficult and complicated tasks, and both require the log-feeding apparatus to be shut down.

Consequently, a prime object of the invention is to provide an arrangement which enables the cylinder pivot location to be moved smoothly, without needing to stop the log-feeding apparatus.

Figure 1:
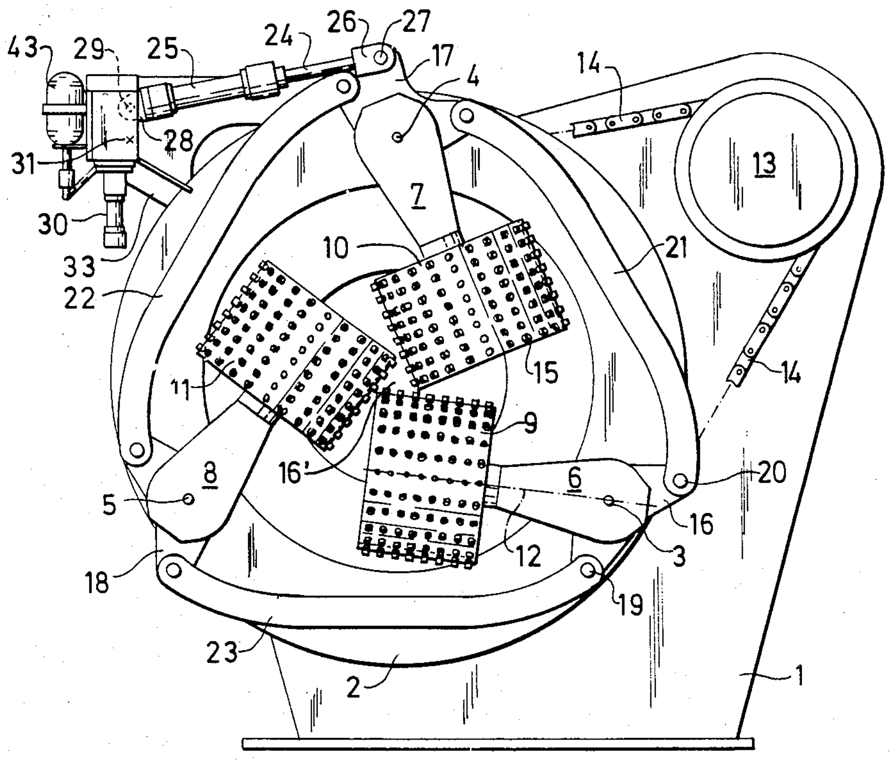
Figure 2:
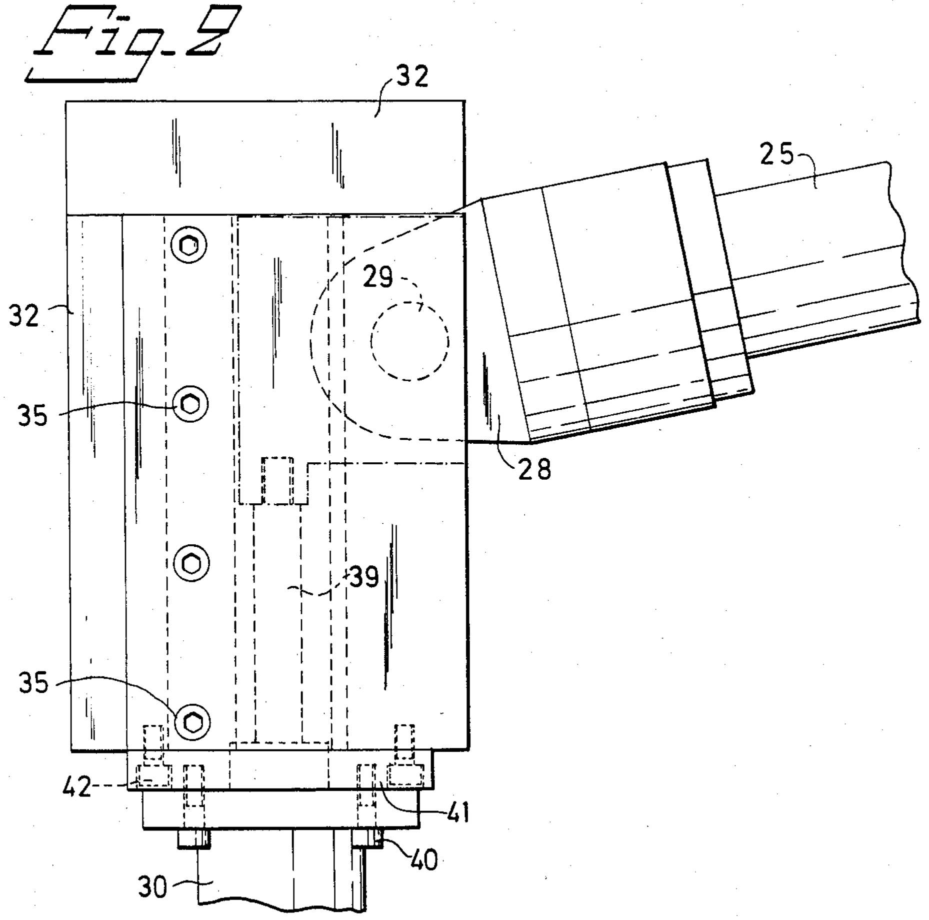
Figure 3:
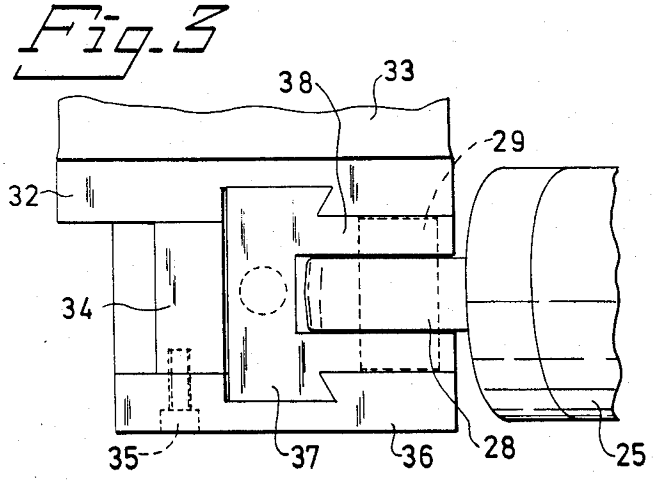

This object is achieved by means of the invention defined in the claims and hereinafter described with reference to the accompanying drawings, in which FIG. 1 is a side view of one embodiment according to the invention, FIG. 2 is a detailed view of the slide means for displacing the cylinder pivot location, seen from the side, and FIG. 3 is a detailed view of the arrangement illustrated in FIG. 2, seen from the top.

In FIG. 1 there is illustrated a log-feeding apparatus having a frame 1 on which a carrier 2 in the form of a ring plate is mounted. The ring plate 2 is provided with three horizontally, outwardly projecting shafts 3, 4 and 5. The shafts 3, 4 and 5 are evenly distributed around a circle, in the illustrated embodiment at an angular spacing of 120 degrees. A feeder arm 6 is pivotally mounted on the shaft 3 while a feeder arm 7 is pivotally mounted on shaft 4 and a feeder arm 8 is pivotally mounted on shaft 5. Arranged for rotation on respective ends of the feed arms are feed rollers 9, 10 and 11. In the illustrated embodiment, the feed rollers are cylindrical and are driven around their cylinder axes, for example the cylinder axis 12, by a motor 13 mounted on the frame 1. In the illustrated embodiment, the motor 13 is assumed to be provided with a chainwheel (not shown), arranged to drive an endless chain 14 extending over sprockets on a drive shaft for each feed frame, said drive shaft, in turn, being arranged to drive the shafts of respective feed rollers through a mitre gear arranged on respective feed arms. Arranged on the cylindrical surfaces of respective feed rollers are dogging means in the form, for example, of pegs 15, which grip into the bark or the surface of the log to be fed through the triangular space 16' formed between the rollers 10, 11, 12, i.e. through the aforementioned primary opening.

The free end portion of respective feed arms 6, 7, 8 remote from associated rollers is provided with an angled double-arm 16, 17 and 18 respectively. Each such double-arm is firmly connected to a respective feed arm, and has two pivot points, for example pivot points 19 and 20 on the angle arm 16. The pivot points 19 and 20 and the shaft 3 thus lie in the corner of a triangle and the term "angle arm" shall thus be interpreted against the background of this definition and not taken to describe the configuration of the arm. The pivot points on the angle arms are connected to links 21, 22 and 23. When, for example, the angle arm 17 is rotated counterclockwise in FIG. 1, corresponding rotation will cause the other two angle arms 16 and 18 and the feed arms 6, 7, 8 to swing counterclockwise, thereby to widen the primary opening 16'.

Pivotally connected to the linkage system is a piston rod 24 of a hydraulic piston-cylinder device 25, to which working fluid is passed through supply lines not shown. In the illustrated embodiment, the piston rod 24 is connected to a pivot pin 27 on the angle arm 17 by means of a fork 26. The free end of the cylinder 25 has a lug 28 which is pivotally mounted on a pivot shaft 29 in a slide hereinafter described with reference to FIGS. 2 and 3. The slide is coupled to the piston rod on an auxiliary or guide cylinder 30, to which working fluid is supplied from a working-fluid source not shown. The aforementioned slide can also be operated by means of, for example, a rack, a steering screw or the like. In FIG. 1, the slide is assumed to be located in its upper position and the piston rod 24 in its fully extended position, in which the illustrated primary opening 16' is formed. If the slide is now drawn down, the pivot shaft 29 of cylinder 25 will be moved to location 31, and therewith the pivot point 27 will be drawn to the left in the Figure, and the linkage system will be affected in a manner to increase the size of the primary opening 16'. Downward movement of the pivot shaft 29 must take place along a circular arc with the pivot point 27 as its centre, and in the illustrated embodiment this movement path is vertical.

Thus, when logs are to be fed through the feed apparatus whose diameter is larger than that of logs previously fed through said apparatus the pivot shaft 29 is moved to the location 31 by withdrawing the piston rod of the piston-cylinder device 30 into its cylinder, without requiring the apparatus to be stopped. Movement of the pivot shaft 29 in this manner can be ordered by a machine operator, who estimates the diameter of an arriving log, or by control signals sent from measuring equipment, such as equipment well known and used within the forestry industry for measuring and sorting logs. As mentioned in the introduction, when a log whose diameter exceeds the size of the primary opening 16' is fed to the feed apparatus, the feed rollers will be forced apart, within a given permitted range, to an extent sufficient to enable the log to pass through said apparatus. In this case, the pressure forces are transmitted to the linkage system and the piston rod 24 is pressed back and working fluid forced out of the cylinder into a gas-filled reservoir 43, which thus forms a spring means and returns the piston 24 to its normal, fully extended position when the log has passed through the log-feeding apparatus.

The slide means will now be described with reference to FIGS. 2 and 3. A cylinder attachment 32 is fixedly mounted to the carrier 2 by means of a bracket 33 (FIG. 1). The cylinder attachment 32 is provided with a distance piece 34 on which a plate 36 is adjacently mounted by means of bolts 35. Arranged on the mutually facing surfaces of the cylinder attachment 32 and the plates 36 are two dovetail grooves for receiving the slide 37. The contours of the slide 37 are shown in FIG. 2 in chain lines, and the slide is located in its upper position in the slide guide formed by members 32, 34 and 36. The slide is provided with a fork 38 through which the shaft 28 passes and pivotally supports the lug 29 of the cylinder 25. The free end of the piston rod 39 of guide cylinder 30 is screwed into the lower end part of the slide 37, and the cylinder 30 is fixed to a cylinder plate 41, by means of bolts 40, said plate, in turn, being fixed to the slide guide by means of bolts 42.

As will be understood, the described arrangement for moving the pivot location of the main cylinder 25 can be modified in various ways within the scope of the following claims.

I claim:

1. An arrangement in log-feeding apparatus of the kind comprising at least three driven feed rollers (9, 10, 11) mounted on feed arms (6, 7, 8) of mutually equal length, said feed rollers forming therebetween a log-receiving space (16), the end portions of each feed arm being pivitally mounted at a location on a circular line on a carrier (2) arranged to be guided by means of a linkage system (16, 17, 18, 21, 22, 23) which is connected to the piston rod (24) of a main, hydraulic piston-cylinder device (25), so that when the piston rod is extended from and withdrawn into said cylinder the rollers are swung towards and away from each other respectively, characterized in that the free end of the main hydraulic cylinder is pivotally connected to a slide (37) in a slide guide (32, 34, 36), and in that adjustment means (30, 39) are provided for displacing the slide (37), therewith to change the distance between the connection point (29) of the main hydraulic cylinder on the slide and connection point (27) of the piston rod (24) of the main cylinder (25) on the linkage system.

2. An apparatus according to claim 1, characterized in that the adjustment means comprises a hydraulic auxiliary cylinder (30) having a piston rod (39), the free end of which piston rod is connected to the slide (37).

3. An apparatus according to claim 1, characterized in that the auxiliary cylinder (30) is arranged to be supplied with working fluid in response to an automatically or manually actuable control system.

4. An apparatus according to claim 2 characterized in that the auxiliary cylinder (30) is arranged to be supplied with working fluid in response to an automatically or manually actuatable control system.

* * * * *